United States Patent [19]

Deno

[11] 4,114,539
[45] Sep. 19, 1978

[54] MEANS FOR TRANSFERRING, COLLECTING AND DISTRIBUTING TROLLEYS IN CONVEYER SYSTEM

[75] Inventor: Kohji Deno, Takatsukishi, Japan

[73] Assignee: Murata Kikai Kabushiki Kaisha, Kyotoshi, Japan

[21] Appl. No.: 723,018

[22] Filed: Sep. 13, 1976

[30] Foreign Application Priority Data

Dec. 11, 1975 [JP] Japan .................................. 50-148023

[51] Int. Cl.² ........................................... B61B 12/02
[52] U.S. Cl. ...................................... 104/165; 104/93; 104/253; 198/833
[58] Field of Search ............... 164/88, 89, 121, 147 R, 164/148 R, 165, 172 S, 172 B, 242, 243, 245, 247, 250, 253; 198/684, 685, 833

[56] References Cited

U.S. PATENT DOCUMENTS

| 2,404,885 | 7/1946 | Pile | 104/93 |
| 2,575,055 | 11/1951 | Jaeger | 104/245 |
| 2,812,724 | 11/1957 | King | 104/172 S |
| 3,055,311 | 9/1962 | Sgriccia et al. | 104/250 |
| 3,194,179 | 7/1965 | Scherer | 104/121 |
| 3,646,656 | 3/1972 | Zilahy et al. | 198/339 |
| 3,807,314 | 4/1974 | Slemmons | 104/165 |
| 3,827,367 | 8/1974 | Paglia | 104/93 |

FOREIGN PATENT DOCUMENTS

| 655,086 | 1/1963 | Canada | 104/172 B |
| 555,465 | 3/1931 | Fed. Rep. of Germany | 104/89 |

*Primary Examiner*—Robert G. Sheridan
*Assistant Examiner*—Carl Rowold
*Attorney, Agent, or Firm*—Whittemore, Hulbert & Belknap

[57] ABSTRACT

A conveyer system including a power line with a running rail and a running chain, a horizontal free line with a running rail, a running belt and a stopper, and trolleys wherein the trolleys are brought into contact with the belt which runs along the running rail of the free line and are transferred along the free line by frictional force with the running belt. The stopper provided on the free line running rail may halt the trolleys against the frictional force of the belt.

10 Claims, 9 Drawing Figures

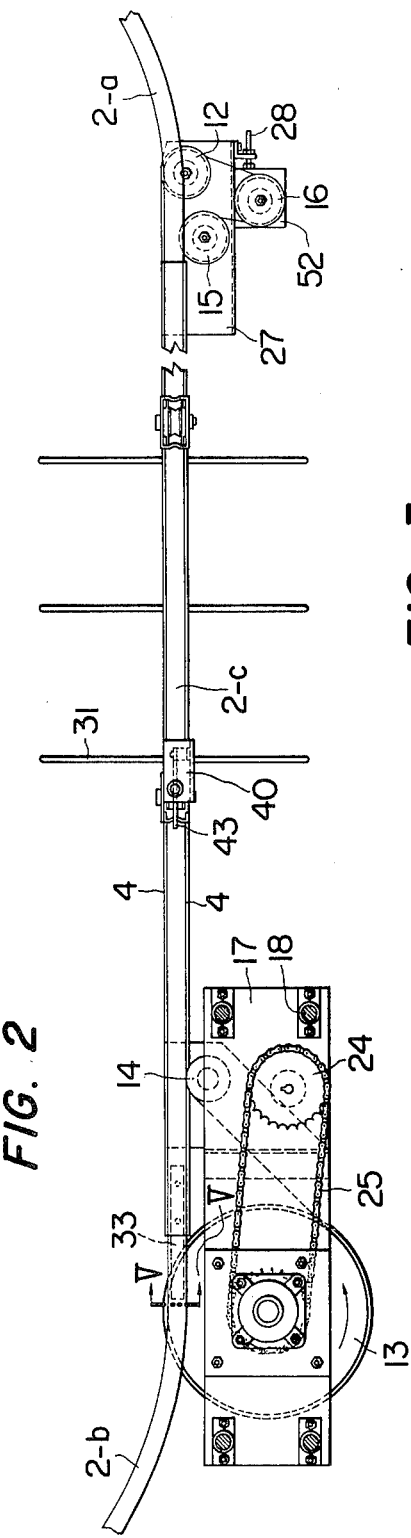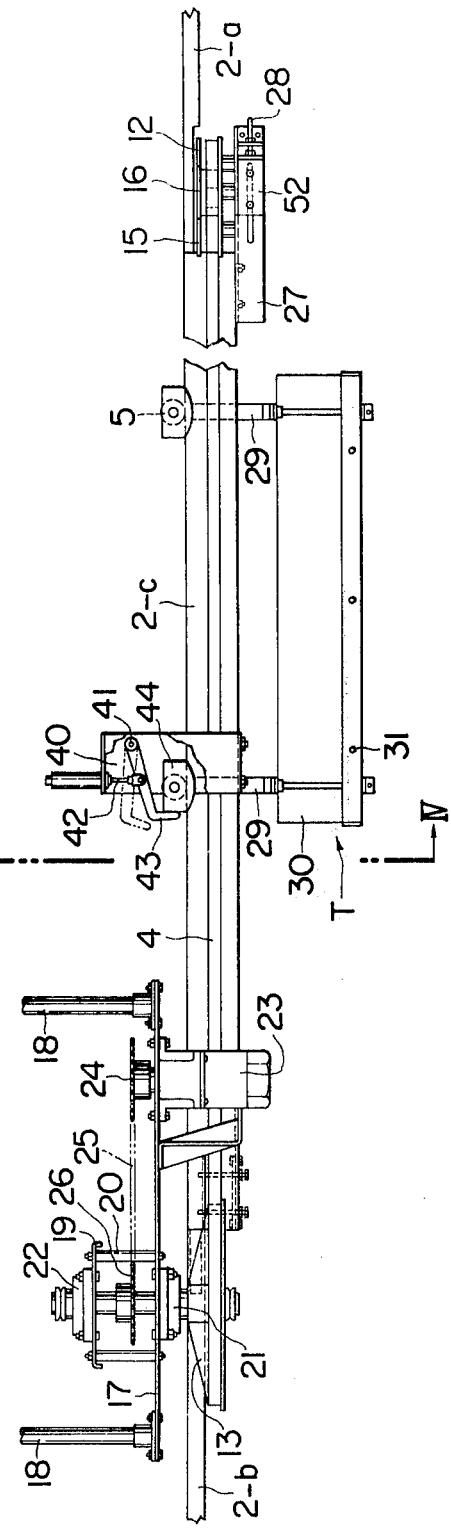

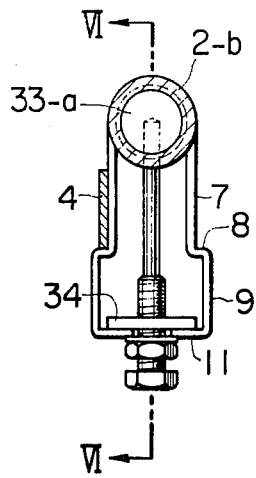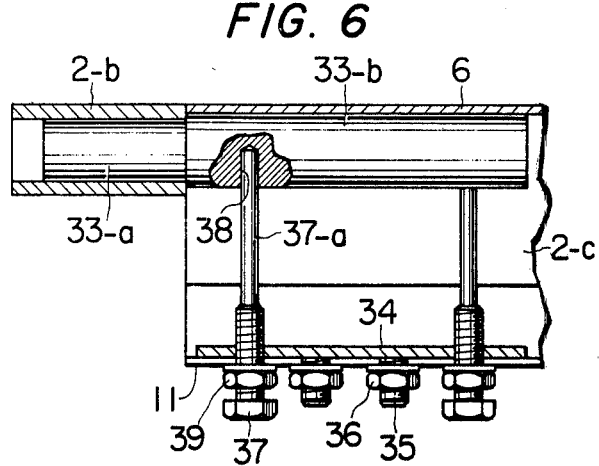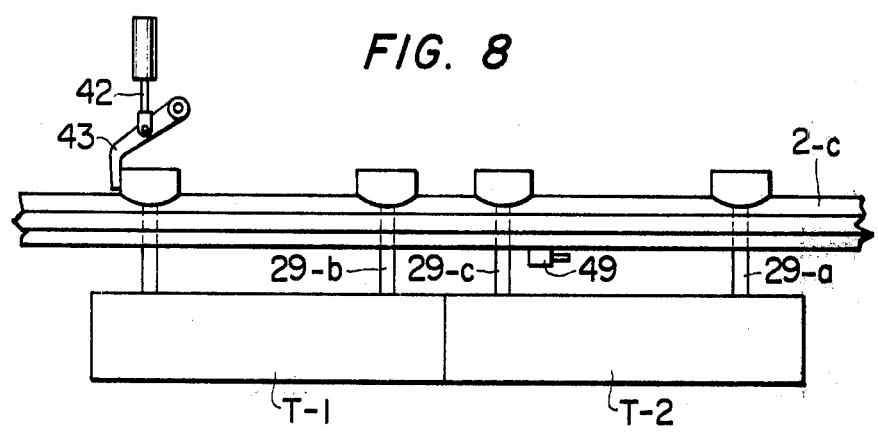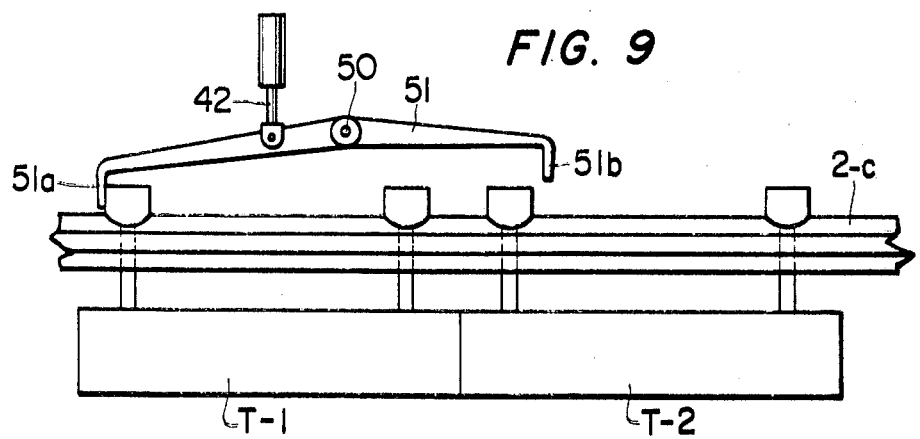

MEANS FOR TRANSFERRING, COLLECTING AND DISTRIBUTING TROLLEYS IN CONVEYER SYSTEM

BACKGROUND OF THE INVENTION

The trend in the handling of mail, clothings, yarn-wound bobbins, etc. in recent years has been placing increasing demand to hang such articles on trolleys which run on a ceiling rail, so that such articles are conveyed while being hung on the trolleys to places where they are stored and handled. In such a transferring device, it is common practice to employ a so-called power line by which the trolleys are engaged with a hook on a chain running along the running rail, so that the trolleys are transferred to the individual storage places and handling places. At the individual storage places and handling places the trolleys have to be halted temporarily on the rail. There is also sometimes employed a so-called free line by which the trolleys are moved on an inclined rail owing to the gravitational force and on which the trolleys are engaged with a stopper and halted at any desired moment on the rail. The aforesaid free line is connected to said power line by means of a branch device.

With reference to the aforesaid free line, however, where the inclination of the inclined rail is small, the trolleys are often stopped and retarded on the inclined rail due to the dust and dirt adhered on the rail, particularly due to the fly waste when the yarn-wound bobbins are being handled. On the other hand, if the inclined rail is too steep, the trolleys tend to be kept run due to the moment of inertia until it collides with another trolley, giving damage to the articles and inviting unexpected accident. That is to say, it is very difficult to find the appropriate inclination of the rail.

Further, when the distance between the article handling places is long, the difference in height increases between one end and the other end of the inclined rail, making handling operation of articles by the workers difficult. For example, in operating the spinning frame, when it is intended to draw a sliver from the sliver bobbin supported by the trolley and to feed and set it to the spinning frame, the height of the bobbin at one end of the long spinning frame becomes taller than the height of a man, making it hard to draw the sliver from the bobbin.

Moreover, when the trolleys are to be taken out from a storage place where a number of trolleys are stored, the aforesaid conventional free lines often fail to start the trolleys even when the stopper is unlocked.

BRIEF SUMMARY OF INVENTION

An object of the present invention is to improve the free line in an attempt to eliminate the aforementioned various defects inherent in the conventional free lines with inclined rails.

According to the present invention, first, the trolleys are brought into contact with the belt which runs along a running rail, to transfer the trolleys semiforcibly utilizing the frictional force of the belt to thereby remove such defects as sudden halt or innertial running of the trolleys.

Further, according to this present invention, a stopper may be engaged with the trolleys in order that the trolleys can be halted at any desired moment against the frictional force of the belt.

In the present invention, the running rail is arrayed horizontally to remove the aforementioned defect of poor workability that results from the difference in height of the both ends of the rails.

Furthermore, according to the present invention, the trolleys are transferred semi-forcibly utilizing the frictional force of the belt. Hence, if the stopper is unlocked, the trolleys that are stopped get start to move immediately and reliably, contributing to eliminate the aforementioned defect associated with the operation of taking the trolleys out of their storage places.

BRIEF DESCRIPTION OF DRAWINGS

FIG. 2 is a plan view of the device of the present invention;
FIG. 3 is a front view of the device of the present invention;
FIG. 5 is a cross-sectional view taken on line V—V of FIG. 2;
FIG. 6 is a cross-sectional view taken on line VI—VI of FIG. 5;
FIG. 8 is a front view showing one embodiment of the trolley halting device;
and
FIG. 9 is a front view showing another embodiment of the trolley halting device.

PREFERRED EMBODIMENT OF INVENTION

Figure 1:
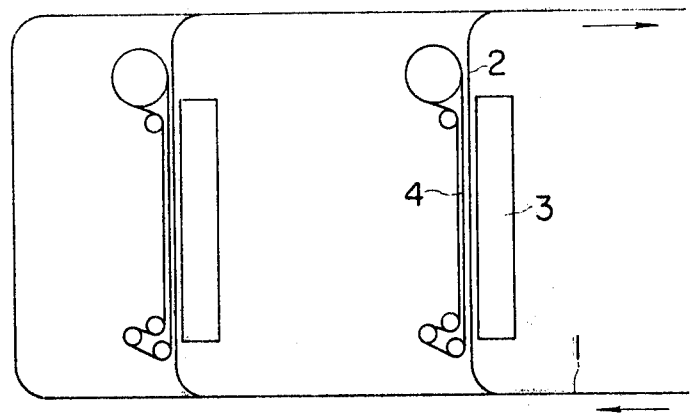
FIG. 1 is a schematic plan view of a conveyer line.

Referring to FIG. 1, the reference numeral 1 stands for a power line equipped with a running chain. The article conveyer trolleys run on the power line in the direction of the arrow. The reference numeral 2 stands for a running rail arranged in a horizontal relation to a free line of this present invention. The running rail 2 is running, for example, in the lengthwise direction of the spinning frame 3, and its both ends are connected to the running rail of the power line 1 by means of a branch device such as a switch. The reference numeral 4 represents a running belt that runs along said rail 2.

Figure 4:
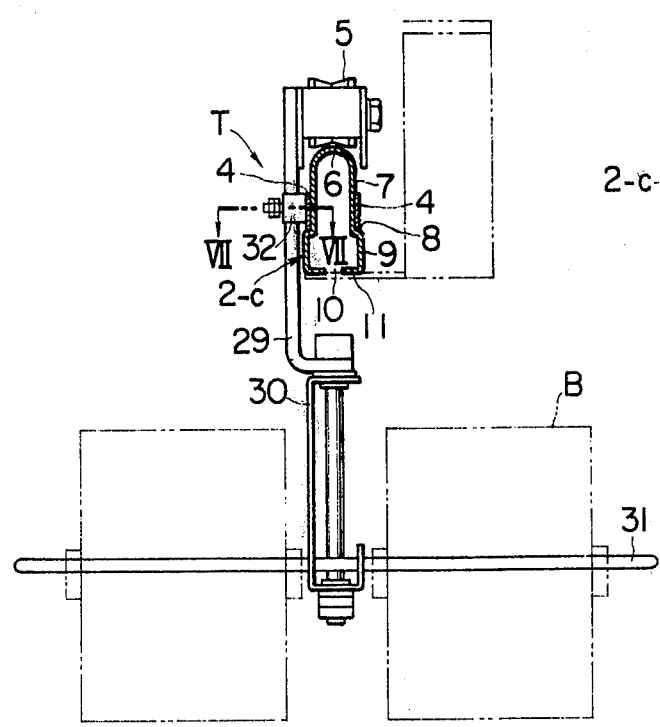
FIG. 4 is a cross-sectional view taken on line IV—IV of FIG. 3.

Referring to FIGS. 2, 3 and 4, the horizontal rail 2 of said free line consists of tubular curved rails 2-a, 2-b that are connected to the branching device, and a rail 2-c which is in parallel with the running belt 4. When the distance between the power line and the rail 2-c is larger than the length of the article conveyer trolley T, the curved rails 2-a and 2-b are inclined a little so that said trolley may be transferred due to its own weight between the power line and the rail 2-c.

The abovesaid rail 2-c assumes a protruded shape in cross section as shown in FIGS. 4 and 5, and consists of a vertical side wall 7 starting from a top curved part 6 that supports wheels 5 of the conveyer trolleys T for bobbins B, horizontal surface 8, lower side wall 9 and a bottom surface 11 having a slit 10 in the lengthwise direction. The rail 2-c can be made by folding, for example, a piece of plate. The rail in this embodiment is excellent in regard to the strength and in mounting accessories to install the rail. The L-shaped surface formed of the side wall 7 and the horizontal surface 8, is utilized to guide the running belt 4.

The running belt 4 runs from a guide pulley 12 along the left side wall 7 of the rail 2-c of FIG. 4 and passes through a drive pulley 13. A guide pulley 14, runs along the right side wall 7 of the rail 2-c of FIG. 4. Belt 4 passes through a guide pulley 15, tensioner pulley 16 and returns to the guide pulley 12 always at a constant speed.

The aforesaid L-shaped surface needs not necessarily be provided on both sides of the rail; the L-shaped surface may be provided only on the drive side, and the other side may have an accessory to support the belt. From the standpoint of function of the external surface of the rail, it is also acceptable to form a L-shaped surface on the surface of the rail made of a bar material.

The reference numeral 17 is a support plate fixed to the ceiling by a rod 18, and the reference numeral 19 is a support board which is fixed to said support plate 17 by means of a rod 20. The aforesaid pulley 13 is supported by the bearings 21, 22 that are fixed to the support plate 17 and support board 19.

A motor 23 secured on the support plate 17 drives the pulley 13 in the direction of arrow of FIG. 2 by a sprocket 24, a chain 25 and a sprocket 26.

Said guide pulley 14 is rotatably supported by the support plate 17, and the guide pulleys 12, 15 are rotatably supported on the support board 27 that is secured to the rail 2-c. The tensioner pulley 16 is supported on a support board 52 that is secured on the support board 27 by way of a bolt 28 maintaining a freedom of position adjustment.

The trolley T consists of an arm 29 which supports the wheel 5, a bracket 30 fastened to said arm 29, a peg 31 for inserting bobbin B or any other conventional hanging hook supported by said bracket 30, and a pressing piece 32 supported at a half-way of the arm 29. Here, the pressing piece may be made of a nylon or an electroplated iron.

FIGS. 5 and 6 show a device for coupling tubular rails 2-a and 2-b with the rail 2-c, and by which a small diametered part 33-a of the rod 33 is inserted in the tubular rail 2-b, a curved apex 6 of the rail 2-c is placed on a large diametered part 33-b, the support board 34 is secured to the bottom surface 11 by way of a bolt 35 studded on the support board 34 and a nut 36, a bolt 37 is screwed into the support board 34 from the lower side of the bottom surface 11 through the slit 10, a pin 37-a at the tip of the bolt 37 is inserted in a hole 38 of the large diametered part 33-b and tightened by a nut 39 when the large diametered part 33-b is closely contacted to the curved apex 6.

In operation, as the trolleys are transferred to the rail 2-c in the direction of the arrow of FIG. 2 from the curved rail 2-a by way of the running chain of the power line, the pressing piece 32 of the trolleys T is pressed to the running belt and to the side wall 7 of the rail 2-c owing to the self weight of the trolleys. The running belt 4 is then compressed between the pressing piece 32 and the side wall 7, so that the trolleys T are transferred along the horizontal rail 2-c owing to the frictional force between the running belt 4 and the pressing piece 32. At the front end of the rail 2-c a stop lever 43 is disposed that is supported by way of shaft 41 by the bracket 40 which is secured to the rail 2-c and which is moved up and down by a piston 42 as shown in FIGS. 2 and 3.

When the stop lever 43 is in a lowered position as shown by solid lines, it hits a wheel covering 44 of the trolley T that is being transferred on the rail 2-c, to halt the trolley T overcoming the frictional transferring force of the running belt. The succeeding trolleys hit the abovesaid halted trolley T and are gathered and stored on the rail 2-c.

If the stop lever 43 is raised to an upper position shown by dotted lines, the trolley T starts to be transferred again owing to the frictional force of the running belt; the trolleys are transferred to the power line from the curved rail 2-b successively.

Figure 7:
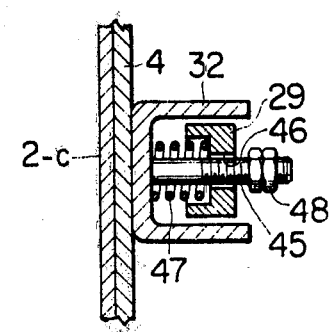
FIG. 7 is a cross-sectional view taken on line VII—VII of FIG. 4.

The pressing piece 32 may be secured to the arm 29, but preferably, a bolt 45 studded on the pressing piece 32 is inserted in a hole 46 of the arm 29, and the pressing piece 32 is resiliently supported with respect to the arm 29 by means of a spring 47 wound on the bolt 45 as shown in FIG. 7, for the purpose that less force is exerted on the stop lever 43, rail 2-c and trolleys when the trolleys are halted by the stop lever 43, and trolleys are transferred smoothly by the running belt 4 even where the rail 2-c is not strictly horizontal, and further that the portions involved in frictional motion are protected by adjusting the strength of the spring according to the piled degree of the articles. The reference numeral 38 denotes a fixing nut to prevent the piece 32 from being loosened and falling out.

Also, where it is intended to transfer the trolleys one by one from the rail 2-c, a microwitch 49 may be installed on the rail 2-c between the front arm and the rear arm of the second trolley T-2 as shown in FIG. 8, in order that the rear arm 29-a of the second trolley T-2 will hit the microswitch 49 after the first trolley T-1 has been transferred, whereby the piston 42 is so actuated that the stop lever 43 is lowered between the rear arm 29-b of the first trolley T-1 and the front arm 29-c of the second trolley T-2. Alternatively, a two-way stop lever 51 which swings with a fulcrum 50 as a center may be installed as shown in FIG. 9, so that when the front hook 51a of the lever 51 is disengaged from the front arm of the first trolley T-1, the rear hook 51b is introduced between the front arm and the rear arm of the succeeding trolley T-2, whereby the rear arm is engaged by the hook 51b to halt the trolley T-2.

As mentioned above, with the free line of this present invention, the trolleys are transferred semi-forcibly due to the frictional contact with respect to the running belt, eliminating the probability that the trolleys are jammed unexpectedly on the free line. Also, by simply unlocking the stopper, the trolleys at rest are started immediately and reliably thereby removing the tendency of inertial running of the trolleys. Moreover, by engaging the stopper with the trolleys, it is possible to halt the trolleys arbitrarily on the free line. In addition, it is allowed to install the rail on a horizontal plane, improving the workability that is often degraded by the difference in height of the rails.

What is claimed is:

1. Means for transferring, collecting and distributing trolleys in a conveyer system comprising a horizontal running rail which supports trolleys and on which trolleys run having a cross section having an upper downwardly opening U-shaped portion including a semi-circular connecting part and straight leg parts, portions extending away from each other connected to the free ends of the leg parts of the U-shaped portion of the rail cross section, then downwardly and then inwardly toward each other terminating in spaced apart relation, a running belt extending along one side of the running rail positioned adjacent the lower portion of one of the leg parts of the U-shaped portion of the running rail cross section and the portions extending away from each other connected thereto, means for driving the running belt and at least one trolley positioned on the running rail including an L-shaped arm, a roller and means for supporting the roller in engagement with the top of the running rail from the top of the L-shaped member, a pressing piece secured to the L-shaped member centrally thereof and in engagement with the running belt adapted to frictionally engage the running belt and press it against the running rail under pressure from a load positioned on the trolley, and including resilient means urging the pressing member toward the running belt, and load supporting structure secured to the lower portion of the L-shaped member.

2. Structure as set forth in claim 1 and further including a lever pivotally mounted adjacent the running belt and means for selectively placing the free end of the lever in contact with a trolley on the running rail for preventing movement of the trolley along the running rail.

3. Structure as set forth in claim 1 wherein the lever is an escapement device and is centrally pivoted, wherein one end of the lever releases a previously stopped trolley on the running belt when the other end of the lever engages a second trolley to be stopped on the running belt.

4. Structure as set forth in claim 1 and further including a hollow cylindrical connecting rail and means for connecting the running rail to the connecting rail comprising a cylindrical member having a small diameter portion positioned within the connecting rail and a larger diameter portion positioned within the top of the U-shaped portion of the running rail having downwardly opening transverse recesses therein, a support board secured to the running rail by stud and bolt means secured thereto and passing through the spaced apart terminal ends thereof and bolts extending through the support board having pin portions on the ends thereof extending into the downwardly extending recesses in the cylindrical member.

5. Means for transferring, collecting and distributing trolleys in a conveyer system comprising a horizontal running rail which supports trolleys and on which the trolleys run, a running belt extending along the length of one side of the running rail and at least one trolley including means for supporting the trolley from the top of the rail, a pressing piece secured to the trolley and engageable with the belt at the side of the rail to frictionally engage the belt and trolley under pressure of a load on the trolley, means for supporting a load from the trolley whereby the pressure force frictionally engaging the trolley and the running belt varies in accordance with the weight of material on the trolley, said running rail including a downwardly opening U-shaped upper portion and means for connecting the running rail to a hollow cylindrical connecting rail comprising a cylindrical member having a smaller diameter portion telescoped within the cylindrical connecting rail and a larger diameter portion having transverse recesses in the side thereof opening downwardly, a support board secured to the running rail across the free ends of the downwardly opening U-shaped upper portion thereof and bolts extending through the support board having pin portions on the ends thereof extending into the downwardly opening recesses in the larger diameter portion of the cylindrical member.

6. Structure as set forth in claim 5 wherein the pressing piece is resiliently supported by the trolley in contact with the running belt.

7. Structure as set forth in claim 5 wherein the running rail has an L-shaped configuration on the one side thereof receiving the running belt in surface to surface contact therewith.

8. Structure as set forth in claim 5 and further including means positioned adjacent the running rail for stopping the movement of the trolley without stopping movement of the running belt whereby slippage between the running belt and pressing piece is produced.

9. Structure as set forth in claim 8 wherein the stopping means comprises a lever and means for moving the lever into a blocking position with respect to the trolley.

10. Structure as set forth in claim 9 wherein the lever is an escapement device operable between two separate trolleys which lever is centrally fulcrumed.

* * * * *